(12) United States Patent
Tsirkin

(10) Patent No.: US 10,795,591 B2
(45) Date of Patent: *Oct. 6, 2020

(54) SAFE USERSPACE DEVICE ACCESS FOR NETWORK FUNCTION VIRTUALIZATION USING AN IOMMU TO MAP SUPERVISOR MEMORY TO A RESERVED RANGE OF APPLICATION VIRTUAL ADDRESSES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,046

(22) Filed: Jan. 29, 2019

(65) Prior Publication Data

US 2019/0155527 A1 May 23, 2019

Related U.S. Application Data

(63) Continuation of application No. 15/441,937, filed on Feb. 24, 2017, now Pat. No. 10,198,202.

(51) Int. Cl.
*G06F 3/06* (2006.01)
*G06F 12/10* (2016.01)
(Continued)

(52) U.S. Cl.
CPC ............ *G06F 3/0619* (2013.01); *G06F 3/068* (2013.01); *G06F 3/0631* (2013.01);
(Continued)

(58) Field of Classification Search
CPC ...... G06F 3/0619; G06F 3/0631; G06F 3/068; G06F 12/1009; G06F 12/1027; G06F 2212/657; G06F 2212/68
See application file for complete search history.

(56) References Cited

U.S. PATENT DOCUMENTS 8,392,628 B2 3/2013 Santos et al.
9,128,625 B1 9/2015 Ananthabhotla
(Continued)

FOREIGN PATENT DOCUMENTS

WO 2013/081942 A1 6/2013

*Primary Examiner* — Glenn Gossage
(74) *Attorney, Agent, or Firm* — K&L Gates LLP

(57) ABSTRACT

A device access system includes a memory having a supervisor memory, a processor, an input output memory management unit (IOMMU), and a supervisor. The supervisor includes a supervisor driver, which executes on the processor to allocate the supervisor memory and reserve a range of application virtual addresses. The supervisor driver programs the IOMMU to map the supervisor memory to the reserved range. A device is granted access to the reserved range, which is protected in host page table entries such that an application cannot modify data within the range. The supervisor driver configures the device to use the supervisor memory and receive a request including a virtual address and length from the application to use the device. The supervisor driver validates the request by verifying that the virtual address and length do not overlap the range reserved by the supervisor, and responsive to validating the request, submits the request to the device.

20 Claims, 6 Drawing Sheets

(51) Int. Cl.
  *G06F 9/455* (2018.01)
  *G06F 12/1009* (2016.01)
  *G06F 12/1081* (2016.01)
  *G06F 12/109* (2016.01)
  *G06F 12/14* (2006.01)
  *G06F 12/1027* (2016.01)

(52) U.S. Cl.
  CPC ........ *G06F 9/45558* (2013.01); *G06F 12/109* (2013.01); *G06F 12/1009* (2013.01); *G06F 12/1027* (2013.01); *G06F 12/1081* (2013.01); *G06F 12/1441* (2013.01); *G06F 2009/45579* (2013.01); *G06F 2009/45595* (2013.01); *G06F 2212/1041* (2013.01); *G06F 2212/1052* (2013.01); *G06F 2212/657* (2013.01); *G06F 2212/68* (2013.01)

(56) References Cited

U.S. PATENT DOCUMENTS

| | | | |
|---|---|---|---|
| 10,140,148 B1* | 11/2018 | Kaplansky | G06F 12/145 |
| 10,198,202 B2* | 2/2019 | Tsirkin | G06F 12/1009 |
| 2011/0225387 A1 | 9/2011 | Pfeffer | |
| 2012/0072906 A1 | 3/2012 | Tsirkin | |
| 2014/0173236 A1 | 6/2014 | Kegel | |
| 2016/0062911 A1 | 3/2016 | Kegel et al. | |
| 2016/0092678 A1 | 3/2016 | Probert et al. | |
| 2017/0147376 A1 | 5/2017 | Tsirkin | |
| 2017/0286326 A1 | 10/2017 | Guim | |
| 2018/0060245 A1* | 3/2018 | Tsirkin | G06F 12/10 |
| 2019/0227834 A1* | 7/2019 | Tsirkin | G06F 21/78 |
| 2020/0125500 A1* | 4/2020 | Guan | G06F 12/0873 |

* cited by examiner

SAFE USERSPACE DEVICE ACCESS FOR NETWORK FUNCTION VIRTUALIZATION USING AN IOMMU TO MAP SUPERVISOR MEMORY TO A RESERVED RANGE OF APPLICATION VIRTUAL ADDRESSES

CROSS REFERENCES TO RELATED APPLICATIONS

This application is a continuation of and claims priority to and the benefit of U.S. patent application Ser. No. 15/441,937, filed on Feb. 24, 2017, now U.S. Pat. No. 10,198,202, the entire content of which is hereby incorporated by reference.

BACKGROUND

Computer systems may run applications and processes used in Network Function Virtualization (NFV) that may communicate and provide connectivity to other devices, such as hardware devices. For example, applications and processes may share memory with physical devices. In computer systems, shared memory may refer to memory that can be accessed simultaneously by different resources, such as computer hardware or software. Such availability allows a single copy of data to service multiple resources, instead of providing a separate copy of the data for each specific resource. The computer system may allow direct device access from the userspace in order to avoid the overhead of communicating with a supervisor and/or operating system (OS).

SUMMARY

The present disclosure provides new and innovative systems and methods of safe userspace physical device access for network function virtualization. In an example, a system includes a memory having a supervisor memory, one or more processors in communication with the memory, an input output memory management unit (IOMMU), and a supervisor. The supervisor includes a supervisor driver, where the supervisor executes on the one or more processors to allocate the supervisor memory and responsive to allocating the supervisor memory, reserve a range of application virtual addresses. The supervisor driver programs the IOMMU to map the supervisor memory to the range of application virtual addresses in the IOMMU. A device is granted access to the range of application virtual addresses, and the range of application virtual addresses is protected in host page table entries such that an application cannot modify data within the range of application virtual addresses. The supervisor driver configures the device to use the supervisor memory and receives a request from the application to use the device. The request includes at least one virtual address and length. The supervisor driver validates the request by verifying that the at least one virtual address and length do not overlap the range of application virtual addresses reserved by the supervisor, and responsive to validating the request, submits the request to the device.

In an example, a method includes allocating, by a supervisor, a supervisor memory. Responsive to the supervisor allocating the supervisor memory, the supervisor reserves a range of application virtual addresses. Additionally, the supervisor programs an IOMMU to map the supervisor memory to the range of application virtual addresses in the IOMMU. A device is granted access to the range of application virtual addresses, and the range of application virtual addresses is protected in host page table entries such that an application cannot modify data within the range of application virtual addresses. The supervisor configures the device to use the supervisor memory and receives a request from the application to use the device. The request includes at least one virtual address and length. The supervisor validates the request by verifying that the at least one virtual address and length do not overlap the range of application virtual addresses reserved by the supervisor. Responsive to validating the request, the supervisor submits the request to the device.

In an example, a non-transitory machine readable medium stores a program, which when executed by a processor, causes a supervisor to allocate a supervisor memory. Responsive to allocating the supervisor memory, the supervisor reserves a range of application virtual addresses and programs an IOMMU to map the supervisor memory to the range of application virtual addresses in the IOMMU. A device is granted access to the range of application virtual addresses, and the range of application virtual addresses is protected in host page table entries such that an application cannot modify data within the range of application virtual addresses. The supervisor configures the device to use the supervisor memory and receives a request from the application to use the device. The request includes at least one virtual address and length. The supervisor validates the request by verifying that the at least one virtual address and length do not overlap the range of application virtual addresses reserved by the supervisor. Responsive to validating the request, the supervisor submits the request to the device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
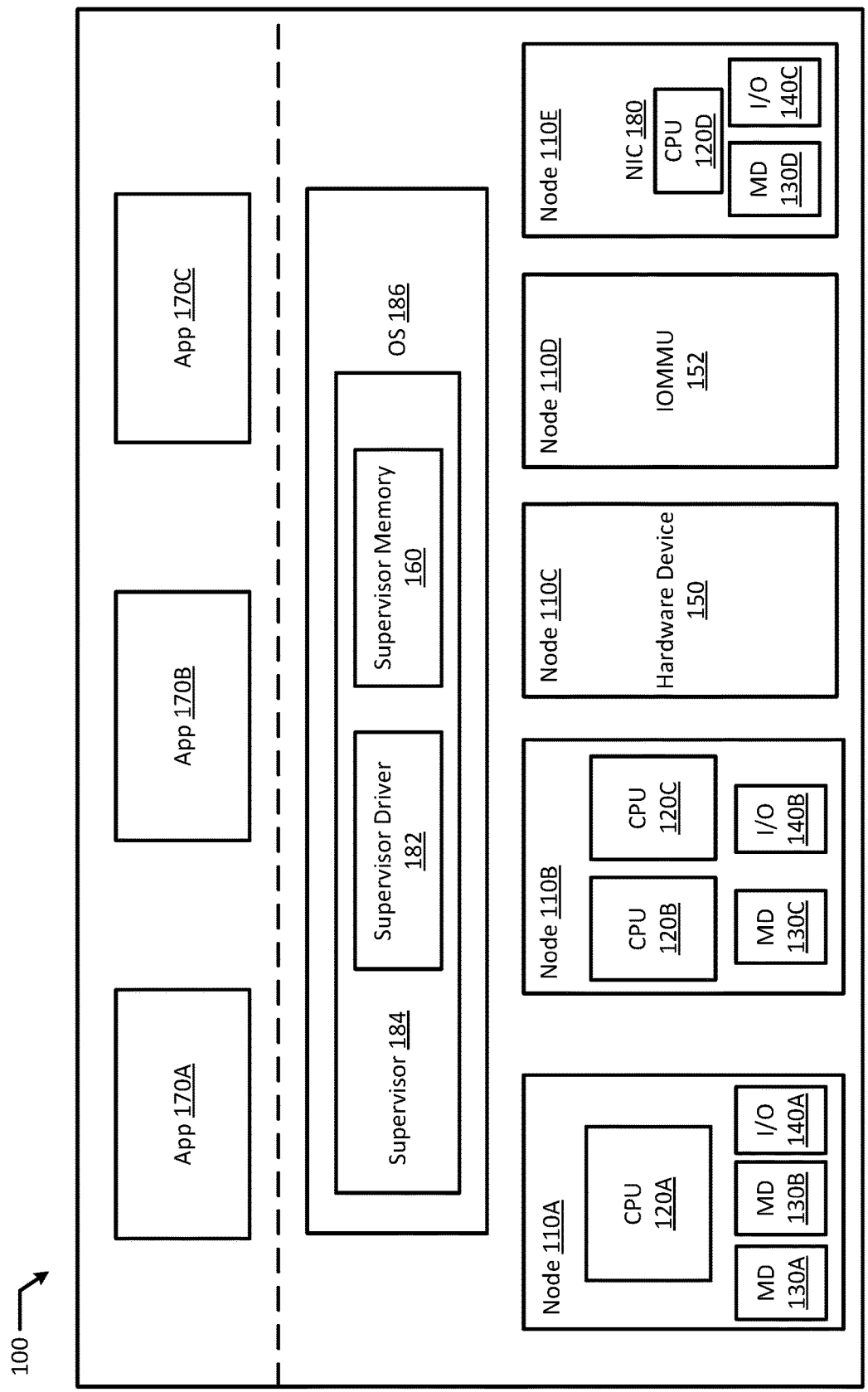
FIG. 1 illustrates a block diagram of an example computer system according to an example embodiment of the present disclosure.

Techniques are disclosed for providing safe user space device access for network function virtualization. Current techniques of improving system performance involve direct device access from the userspace which allows significant performance gains by avoiding data copy and translation overheads. Unfortunately, device access from the userspace also creates security risks. For example, allowing applications in the userspace to directly access a device may enable applications to damage the device. An application may delete or alter data that the device uses for internal purposes, either intentionally and maliciously, or inadvertently, thereby corrupting and/or breaking the device.

Typically, an input output memory management unit (IOMMU) is present to protect the operating system (OS) and other applications from userspace bugs and security issues. However, the IOMMU does not protect the device, therefore, userspace failures may lead to physical device breakage, which may be temporary or permanent. For example, applications with access to the supervisor memory may overwrite device specific memory (e.g., supervisor memory for internal device functions). This may be intentional due to malware, or the application may overwrite supervisor memory unintentionally. For example, a physical device may break due to userspace failures resulting from a situation in which a program, such as a user application, stops performing its expected functions and/or maliciously alters device memory. In some cases, devices may be designed with hardware that has enhanced security features. However, designing security features into hardware is expensive and may be OS dependent.

As discussed in the various example embodiments disclosed herein, to increase security, a supervisor driver for a device, such as a network interface controller, allocates supervisor memory and reserves a range of application virtual addresses for the supervisor memory. A device is allowed access to these virtual addresses, which are protected in central processing unit (CPU) page table entries. Since the virtual addresses are protected, an application can not modify the virtual addresses. The supervisor driver configures the device to use the reserved memory for internal purposes and verifies that application requests to use the device do not include addresses within the reserved range, thereby advantageously protecting the reserved range of supervisor memory. For example, by preventing the application from accessing the reserved range of addresses, the application is advantageously prevented from corrupting the reserved memory and breaking the device. After validating that the request does not overlap the reserved (e.g., protected) range, the supervisor driver submits the request to the device so that the device can perform its requested function without risk of breaking. For example, the supervisor stores the request in the allocated supervisor memory and submits the request to the device using a virtual address in the reserved range. The address range check consumes very little resources as it is faster than software address translation and provides additional security to the system. As mentioned above, hardware may be enhanced with security features, however, these hardware features are often expensive and my be OS dependent. Thus, the present disclosure provides a more cost effective solution to the above discussed problems because software can be used in systems that implement the supervisor and supervisor driver to protect physical devices. For example, by improving security and reducing the risk of malicious attempts to access devices through the supervisor, hardware devices can be used without the need of added hardware security features.

FIG. 1 depicts a high-level component diagram of an example computer system 100 in accordance with one or more aspects of the present disclosure. The computer system 100 may include an operating system (OS) 186, which may include a supervisor 184. The supervisor 184 may be a program. For example, the supervisor 184 may be a program that constitutes the core of the OS 186. As used herein, the supervisor 184 may refer to a privileged software component of the OS 186. For example, the supervisor 184 may have the ability to change memory mappings for an application (e.g., Applications or Apps 170A-C). Additionally, the supervisor 184 may act as a controller of multiple processes including individual user processes within an application memory space. For example, the supervisor 184 may perform several tasks such as executing processes and handling interrupts. Additionally a user may run programs or applications (e.g., Applications 170A-C) in the application memory space. An application (e.g., Applications 170A-C) may be an application in userspace, an application in a virtual machine, or an application located elsewhere, all of which make up the application memory space. As used herein, an application (e.g., Applications 170A-C) may refer to less privileged software without the ability to change memory mappings for itself. The supervisor 184 may provide basic services for the OS 186 that are requested by other parts of the OS 186 or by application programs. For example, the supervisor 184 may provide basic services such as memory management, process management, file management, and I/O management. In an example, the supervisor 184 may be part of a kernel.

In various example embodiments, the supervisor 184 may include supervisor driver 182 and supervisor memory 160. In an example, the supervisor driver 182 may be a program that allows the OS 186 and/or supervisor 184 to interact with hardware devices (e.g., hardware device 150 or network interface controller (NIC) 180). The supervisor driver 182 may also be configured to allocate a first portion of memory, such as supervisor memory 160 and reserve a range of application virtual addresses for the first portion of memory, e.g. supervisor memory 160. In an example, the supervisor memory may include one or more supervisor memory pages. The supervisor driver 182 may also prevent access to the reserved range from applications (e.g., Applications 170A-C), which advantageously increases security and prevents applications (e.g., Applications 170A-C) from modifying the reserved memory, which advantageously prevents device failure. For example, some physical memory pages (e.g., the first portion of memory) may not be writable by an application (e.g., Applications 170A-C) in the application memory space made of up the first portion of memory and a second portion of memory, which may increase security of the system and may prevent an application (e.g., Applications 170A-C) from crashing the userspace and/or breaking the device.

The computer system 100 may include one or more interconnected nodes 110A-E. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a device, such as hardware device 150 or input output memory management unit (IOMMU) 152. In an example, a hardware device (e.g., hardware device 150) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. A node 110E may include a network interface controller 180. Network interface controller 180 may include a processor (e.g., CPU 120D), a memory (e.g., memory device 130D), and an input output device (e.g., I/O 140C). The computer system 100 may also include one or more applications (e.g., Applications 170A-C) operating within application memory space.

As used herein, physical processor or processor (e.g., CPU 120A-D) refers to a device capable of executing instructions encoding arithmetic, logical, and/or I/O operations. In one illustrative example, a processor may follow a Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as random access memory (RAM), read-only memory (ROM), electrically erasable read only memory (EEPROM), or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
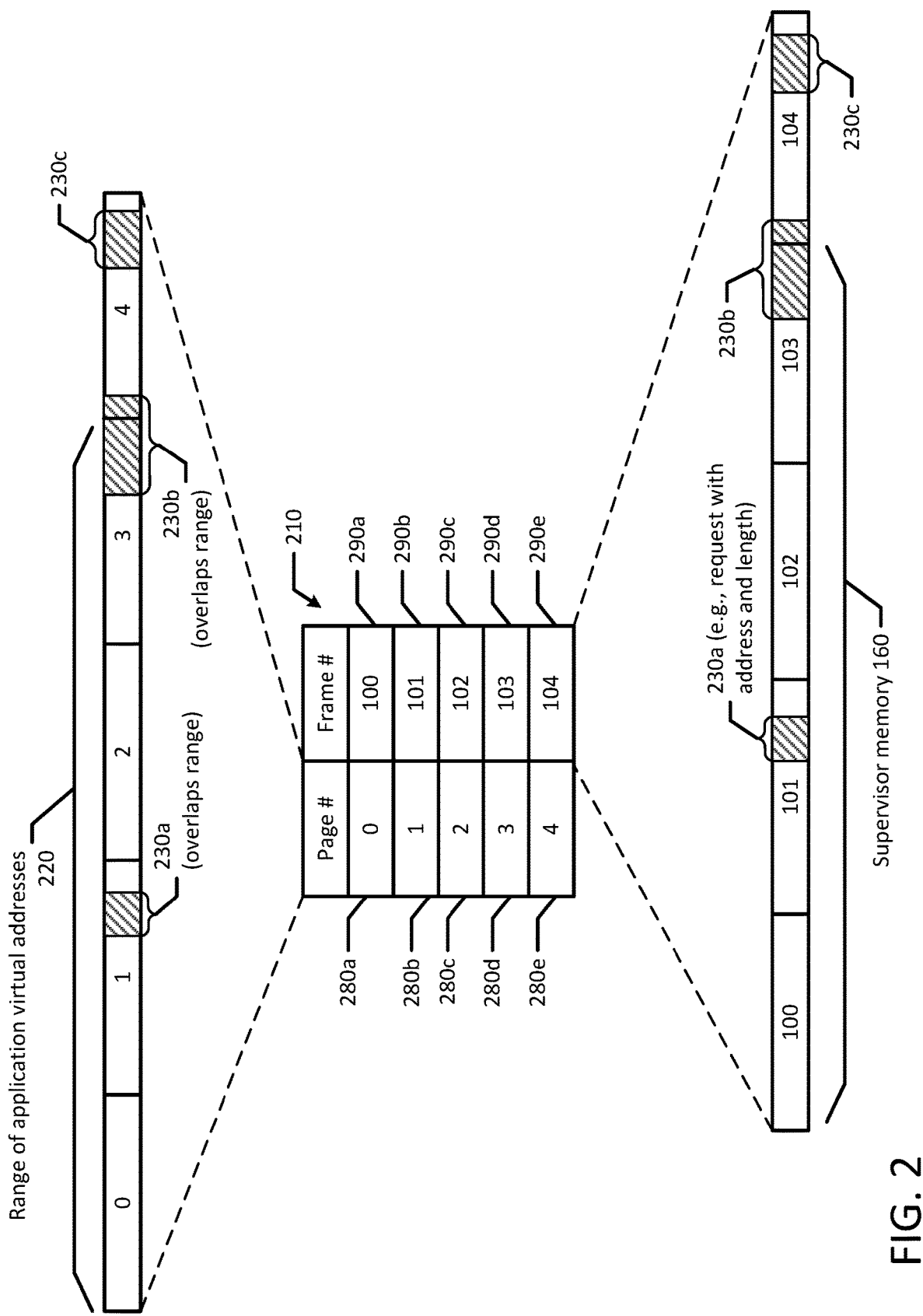
FIG. 2 illustrates an example page table and memory address ranges according to an example embodiment of the present disclosure.

FIG. 2 illustrates an example page table 210. Page table 210 may be a host page table that includes a mapping of the supervisor memory 160 to the range of application virtual addresses 220. For example, the range of application virtual addresses 220 may be represented by the pages 280a-e, hereinafter pages 280 (e.g., Page_0 to Page_4) in the page table 210. In an example, each contiguous range of virtual addresses may be represented by a page 280. Additionally, physical memory (e.g., supervisor memory 160) may be split into page frames 290a-e, hereinafter page frames 290. For example, the pages 280 may be mapped onto frames 290. For example, Page_0 may be mapped to page_frame_100. In an example, a device (e.g., NIC 180) may access the supervisor memory 160 through a virtual address in the range of application virtual addresses 220 reserved by the supervisor 184.

An application 170 may request to use a device (e.g., NIC 180). In an example, the request (e.g., request 230a-c) may include a virtual address and a length. Additionally, the supervisor 184 may store the request (e.g., request 230a-c) in the supervisor memory 160. The supervisor 184 may validate whether the request (e.g., request 230a-c) does not overlap the reserved range of application virtual addresses 220. As illustrated in FIG. 2, request 230a and request 230b overlap the reserved range of application virtual addresses 220. These requests (e.g., request 230a-b) would be denied by supervisor 184. Additionally, request 230c does not overlap the reserved range of application virtual addresses 220 and may be submitted to the device (e.g., NIC 180).

Figure 3:
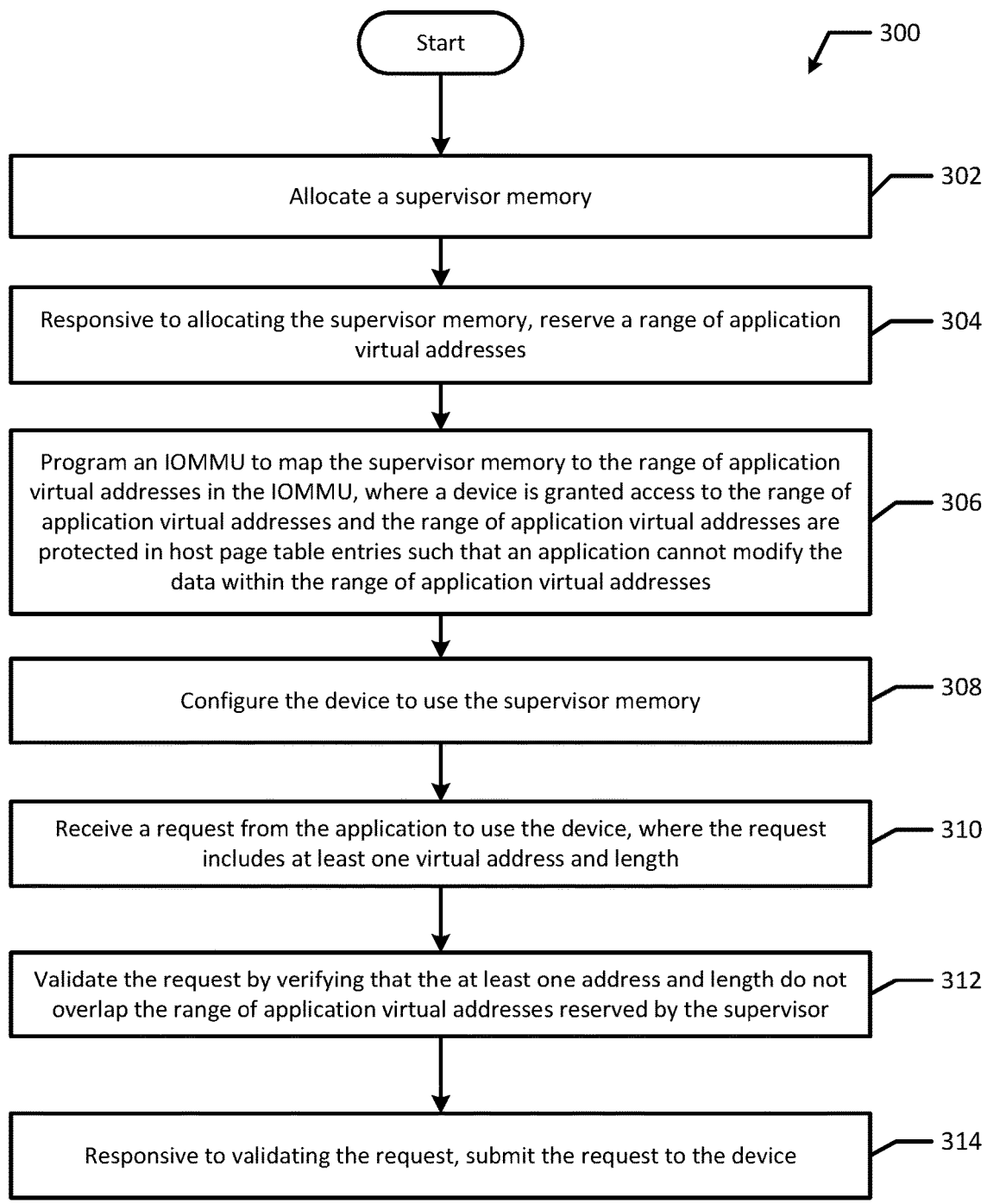
FIG. 3 illustrates a flowchart of an example process for safe userspace device access according to an example embodiment of the present disclosure.

FIG. 3 illustrates a flowchart of an example method 300 for safe userspace device access in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes a supervisor allocating a supervisor memory (block 302). For example, the supervisor 184 may allocate supervisor memory 160 associated with a device 150. In an example, the supervisor driver 182 may allocate supervisor memory 160. For example, the supervisor 184 may instruct the supervisor driver 182 to allocate supervisor memory 160. Responsive to allocating the supervisor memory, the supervisor may reserve a range of application virtual addresses (block 304). For example, the supervisor 184 may reserve a range of application virtual addresses 220. In an example, the supervisor driver 182 may reserve a range of application virtual addresses 220. Then, the supervisor may program an IOMMU to map the supervisor memory to the range of application virtual addresses in the IOMMU, where a device 150 is granted access to the range of application virtual addresses 220 and the range of application virtual addresses 220 are protected in host page table entries such that an application (e.g., application 170A-C) cannot modify the data within the range of application virtual addresses 220 (block 306). In an example, a device 150 may be granted access to the range of application virtual addresses 220. In another example, a NIC 180 may be granted access to the range of application virtual addresses 220. Additionally, the application virtual addresses 220 may be protected in host page table entries in page table 210, such that an application (e.g., application 170A-C) cannot modify data within the range of application virtual addresses 220, thereby enhancing security by preventing applications 170A-C from breaking the device 150 or the NIC 180.

Then, the supervisor may configure the device to use the supervisor memory (block 308). For example, the supervisor 184 may configure the device 150 or the NIC 180 to use the supervisor memory 160. In an example, the device may use the supervisor memory 160 for internal purposes, such as storing a value to ensure the device runs properly with the OS 186. Additionally, the device may use supervisor memory 160 for extra storage space. In an example, the device 150 may use the supervisor memory 180 for communication with the supervisor 184. The supervisor may receive a request from the application to use the device, where the request includes at least one virtual address and length (block 310). For example, the supervisor 182 may receive a request from the application 170 to use the device 150 or the NIC 180. In an example, the request may include at least one virtual address and length. Additionally, the supervisor 184 may store the request (e.g., request 230a-c) in the supervisor memory 160. The supervisor may validate the request by verifying that the at least one virtual address and length do not overlap the range of application virtual addresses reserved by the supervisor (block 312). In an example, the supervisor 184 may execute a memory access at a first address to validate the addresses and lengths included in a request 230. For example, the supervisor 184 may execute a memory access at an address included in the request 230. In an example, the supervisor 184 may read data stored at the first address and determine the length of the address. In another example, the supervisor 184 may verify that the address in the request 230 does not trigger a fault. Responsive to validating the request, the supervisor may submit the request to the device (block 314). For example, the supervisor 184 may submit the request to the device 150 or the NIC 180 after validating the request, thereby advantageously preventing applications 170A-C from accessing the restricted memory range. In an example, the supervisor 184 may submit the request to the device 150 or NIC 180 by using a virtual address in the range of application virtual addresses 220 reserved by the supervisor 184.

Figure 4A:
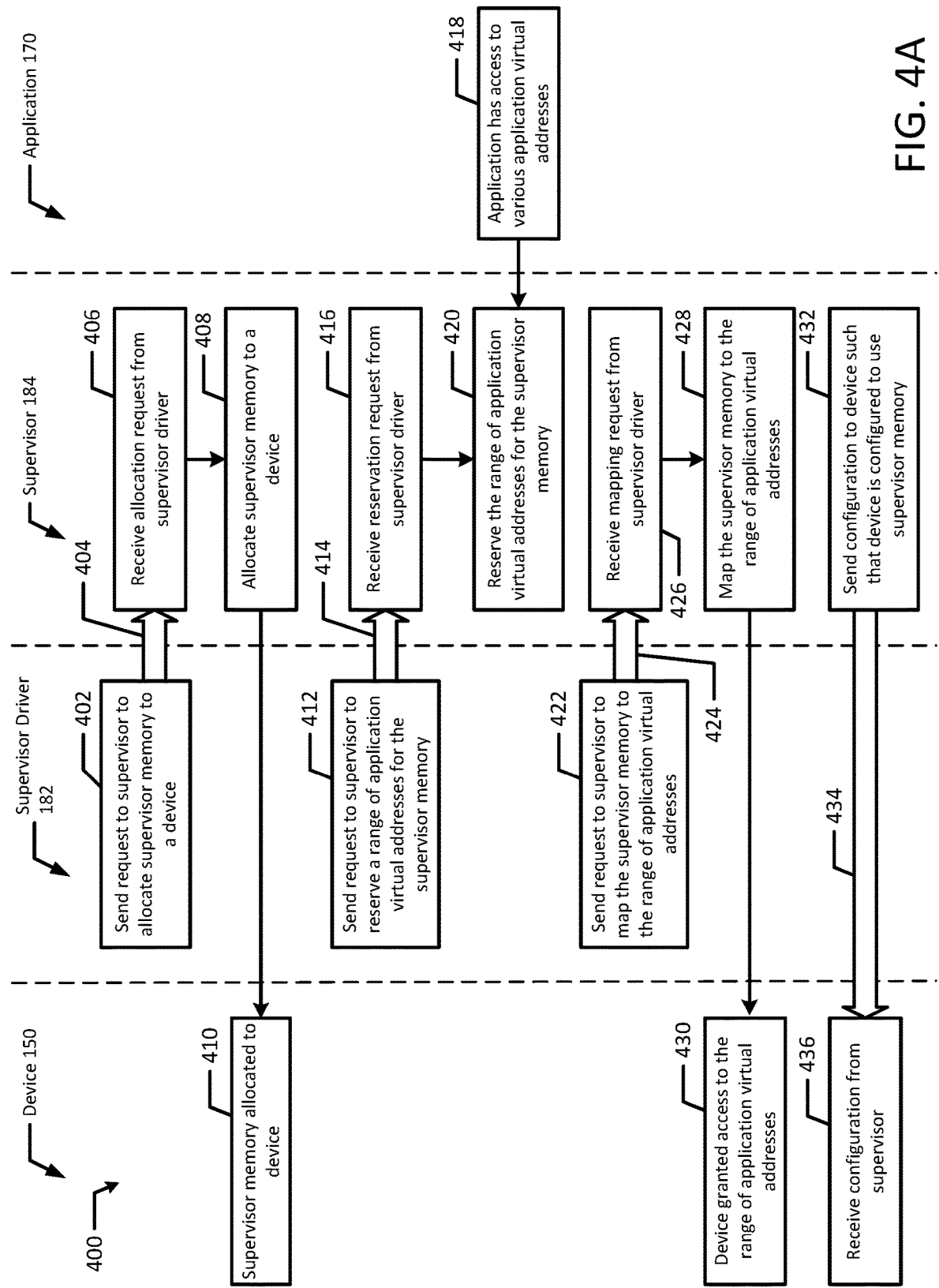
FIGS. 4A and 4B illustrate a flow diagram of an example process for safe userspace device access for network function virtualization by mapping supervisor memory to a reserved range of application virtual addresses according to an example embodiment of the present disclosure.
Figure 4B:
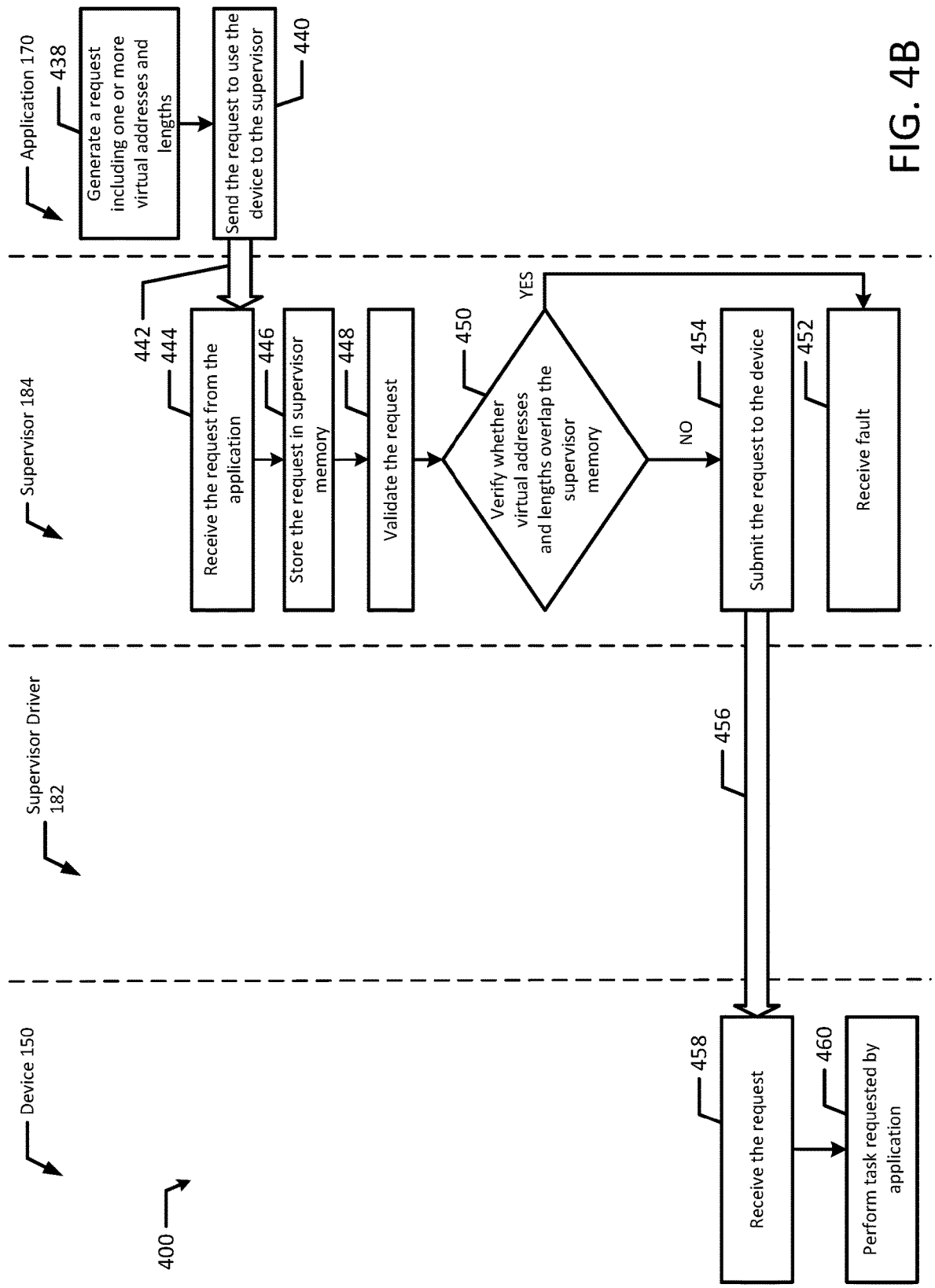

FIGS. 4A and 4B illustrate a flowchart of an example method 400 for safe userspace device access for network function virtualization by mapping supervisor memory to a reserved range of application virtual addresses in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. For example, device 150, supervisor 184, supervisor driver 182, and application 170 may communicate to perform example method 400. In the description of the flowchart illustrated in FIGS. 4A and 4B, "blocks" may refer to blocks or arrows.

In the illustrated example, the supervisor driver 182 may send a request to supervisor 184 to allocate supervisor memory 160 to a device 150 (blocks 402 and 404). For example, the supervisor driver 182 may request the supervisor 184 to allocate 2 GB of supervisor memory 160 to device 150. In an example, the supervisor driver 182 may be loaded into the supervisor 184. Additionally, the supervisor memory 160 may include one or more supervisor memory pages. Then, the supervisor 184 may receive the allocation request from the supervisor driver 182 (block 406). In an example, the request may be in the form of a notification, an instruction, a message, or the like. The supervisor 184 may allocate supervisor memory 160 to a device 150 (blocks 408 and 410). For example, the supervisor 184 may allocate 2 GB of supervisor memory 160 to the device 150. In an example, device 150 may be a hardware device. In another example, device 150 many be a NIC. Then, the supervisor driver 182 may send a request to the supervisor 184 to reserve a range of application virtual addresses 220 for the supervisor memory 160 (blocks 412 and 414). In an example, the range of application virtual addresses 220 may be a continuous range. In another example, the range of application virtual addresses 220 may be scattered. Then, the supervisor 184 may receive the reservation request from the supervisor driver 182 (block 416). For example, the supervisor 184 may receive the request to reserve a range of application virtual addresses 220 that are protected. For example, application 170 is prevented from using virtual addresses within the range of application virtual addresses 220, thereby enhancing security and advantageously preventing userspace failures and device breaks caused by malicious memory modification.

Application 170 may have access to various application virtual addresses (block 418). The supervisor 182 may reserve a range of application virtual addresses 220 for the supervisor memory 160 (block 420). For example, the supervisor 182 may reserve a range of application virtual addresses 220 associated with the 2 GB of supervisor memory 160 dedicated to device 150. Then, the supervisor driver 182 may send a request to the supervisor 184 to map the supervisor memory 160 to the range of application virtual addresses 220 (blocks 422 and 424). In an example, the supervisor driver 182 may send a request to an IOMMU 152 (shown in FIG. 1) to map the supervisor memory 160 to the range of application virtual addresses 220. For example, the supervisor driver 182 may send a request to the supervisor 184, which may then forward the request to the IOMMU 152. The supervisor 184 may receive the mapping request from the supervisor driver 182 (block 426). Additionally, the IOMMU may directly receive the mapping request from the supervisor driver 182.

Then, the supervisor 184 may map the supervisor memory 160 to the range of application virtual addresses 220 (block 428). For example, the supervisor 184 may program an IOMMU 152 to map the supervisor memory 160 to the range of application virtual addresses 220 in the IOMMU 152. Device 150 may be granted access to the range of application virtual addresses 220 (block 430). For example, device 150 may be granted access to the range of application virtual addresses 220 associated with the supervisor memory 160. Then, the supervisor 184 may send a configuration to device 150 such that the device 150 is configured to use the supervisor memory 160 (blocks 432 and 434). For example, the device 150 may be given access, such as read/write access to the supervisor memory 160. The device 150 may receive the configuration from the supervisor 184 (block 436). In an example, device 150 may use the supervisor memory 160 for extra storage space, such as for storing a value associated with the OS 186 to ensure the device 150 runs properly.

An application 170 may generate a request including one or more virtual addresses (e.g., virtual addresses "2800", "5600") and lengths (e.g., 4 kilobyte (kb), 1 kb) (block 438). For example, the request may involve data that is located at a specific virtual address associated with device 150. Then, the application 170 may send the request to use device 150 to the supervisor 184 (block 440 and 442). For example, the request may involve modifying data or page table entries associated with device 150. Then, the supervisor 184 may receive the request from the application 170 (block 444). In an example, the request may be in the form of a notification, an instruction, a message, or the like.

Then, the supervisor 184 may store the request in the supervisor memory 160 (block 446). For example, the supervisor may store the application's request in the supervisor memory 160 allocated by the supervisor 184. The supervisor 184 may validate the request (block 448). For example, the supervisor 184 may verify whether the one or more virtual addresses and lengths overlap the range of application virtual addresses 220 (block 450). If the virtual addresses and lengths in the request overlap the reserved range of application virtual memory addresses 220, then the supervisor 184 may receive a fault (block 452). For example, the supervisor may receive the fault because the application 170 is not allowed direct access to the reserved memory associated with the device 150. The supervisor 184 may block any requests with addresses or lengths that overlap anything in the reserved range to increase security and prevent failure or breakage of device 150. In an example, if the supervisor 184 receives a fault, the supervisor 184 may issue an interrupt to block the request. By verifying the requests do not overlap the restricted range of memory, security is improved as the userspace is not allowed access to the protected memory of device 150. Thus, only legal attempts to access the device 150 are approved.

If the virtual addresses and lengths do not overlap the range of application virtual addresses 220 associated with the supervisor memory 160 (NO at block 450), the supervisor 184 may submit the request to the device 150 (blocks 454 and 456). For example, if the virtual address and/or length do not overlap the protected range, then there is no risk with corrupting the device 150. Additionally, the request does not involve the protected range and thus does not involve the range of application virtual addresses associated with internal device functions. In an example, the supervisor 184 may submit the request to the device 150 using a virtual address in the range of application virtual addresses 220 reserved by the supervisor 184. Then, the device 150 may receive the request (block 458). The device 150 may then perform a task requested by application 170 without risking the application altering the reserved memory range (block 460).

Figure 5:
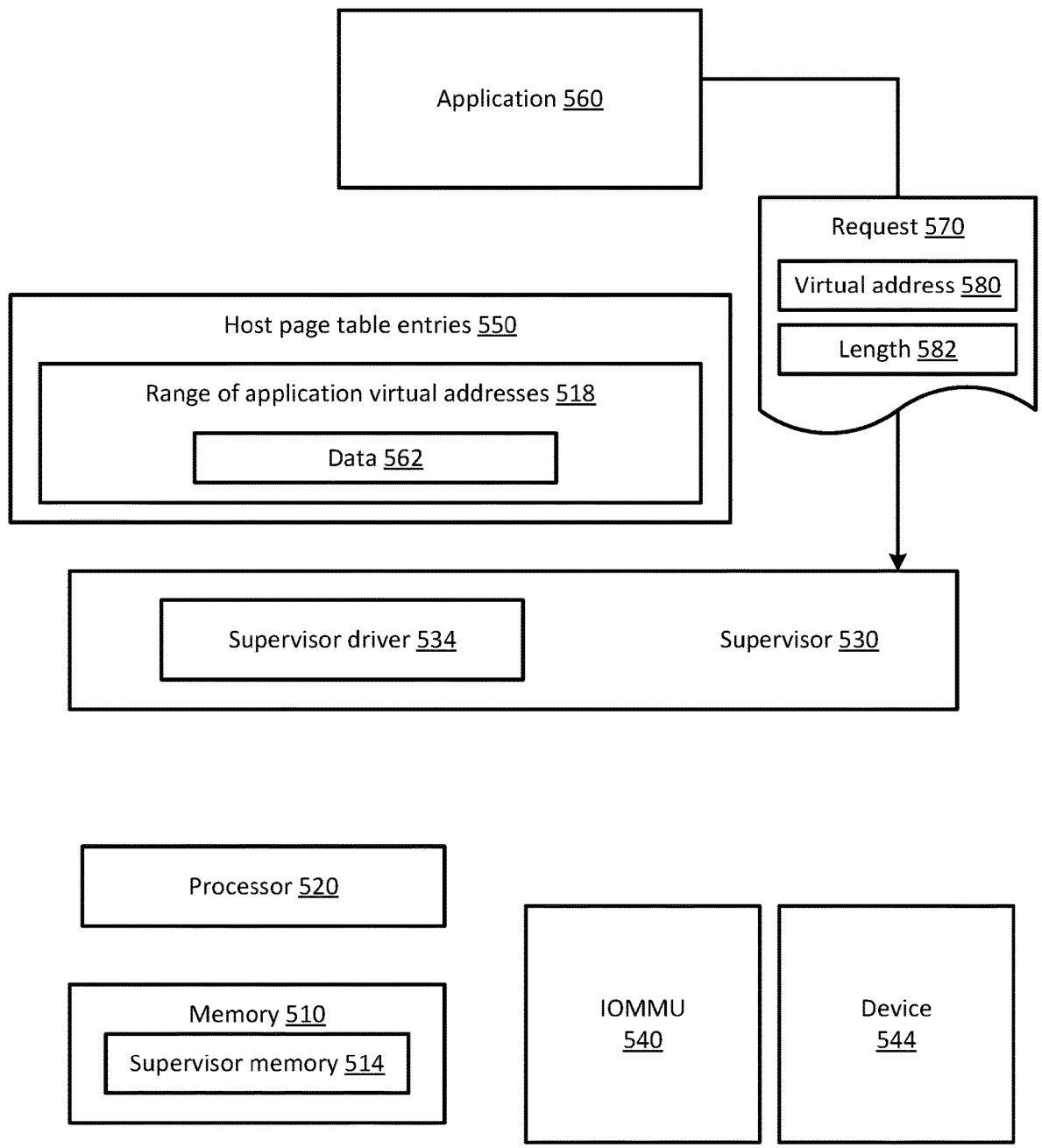
FIG. 5 illustrates a block diagram of an example safe userspace device access system according to an example embodiment of the present disclosure.

FIG. 5 is a block diagram of an example safe userspace device access system 500 according to an example embodiment of the present disclosure. The safe userspace device access system 500 may include a memory 510, having a supervisor memory 514, and one or more physical processors (e.g., processor 520) in communication with the memory 510. The safe userspace device access system 500 may include a supervisor 530 including a supervisor driver 534. The supervisor 530 may execute on the one or more physical processors (e.g., processor 520) to allocate the supervisor memory 514. Responsive to allocating the supervisor memory 514, the supervisor driver 534 may reserve a range of application virtual addresses 518 and program an IOMMU 540 to map the supervisor memory 514 to the range of application virtual addresses 518 in the IOMMU 540. A device 544 may be granted access to the range of application virtual addresses 518. Additionally, the range of application virtual addresses 518 may be protected in host page table entries 550 such that an application 560 may not modify data 562 within the range of application virtual addresses 518. The supervisor 530 may configure the device 544 to use the supervisor memory 514. Additionally, the supervisor 530 may receive a request 570 from the application 560 to use the device 544. The request may include at least one virtual address 580 and length 582. Then, the supervisor 530 may validate the request 570 by verifying that the at least one virtual address 580 and length 582 do not overlap the range of application virtual addresses 518 reserved by the supervisor 530. Responsive to validating the request 570, the supervisor 530 may submit the request 570 to the device 544.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory having a first portion and a second portion of memory;
an input output memory management unit (IOMMU); and
a processor configured to:
allocate the first portion of memory,
reserve a range of application virtual addresses,
program the IOMMU to map the first portion of memory to the range of application virtual addresses in the IOMMU, wherein an application is restricted from modifying data within the range of application virtual addresses,
configure a device to use the first portion of memory,
receive a request including at least one virtual address and length from the application to use the device,
verify that the at least one virtual address and length in the request do not overlap the range of application virtual addresses reserved by the processor, and
submit the request to the device.

2. The system of claim 1, wherein the application is restricted from accessing the data within the range of application virtual addresses.

3. The system of claim 1, further comprising a driver, wherein the driver executes on the processor.

4. The system of claim 1, wherein the range of application virtual addresses is continuous.

5. The system of claim 1, wherein the processor stores the request in the first portion of memory.

6. The system of claim 1, wherein the processor submits the request to the device using a virtual address in the range of application virtual addresses reserved by the processor.

7. A method comprising:
allocating a first portion of memory, wherein the memory also has a second portion;
reserving a range of application virtual addresses;
programming an input output memory management unit (IOMMU) to map the first portion of memory to the range of application virtual addresses in the IOMMU, wherein an application is restricted from modifying data within the range of application virtual addresses;
configuring a device to use the first portion of memory;
receiving a request including at least one virtual address and length from the application to use the device;
verifying that the at least one virtual address and length in the request do not overlap the reserved range of application virtual addresses; and
submitting the request to the device.

8. The method of claim 7, further comprising executing, by the device, the request.

9. The method of claim 7, further comprising storing the request in the first portion of memory.

10. The method of claim 7, wherein a processor submits the request to the device using a virtual address in the reserved range of application virtual addresses, and the device accesses an application memory through the at least one virtual address included in the request.

11. The method of claim 7, further comprising accessing, by the device, the first portion of memory through a virtual address in the reserved range of application virtual addresses.

12. The method of claim 7, wherein the application is restricted from accessing the data within the range of application virtual addresses.

13. The method of claim 7, wherein a driver submits a request to allocate the first portion of memory to the device.

14. The method of claim 13, wherein the driver submits a request to reserve the range of application virtual addresses for the first portion of memory.

15. The method of claim 14, wherein the driver submits a request to program the IOMMU to map the first portion of memory to the range of application virtual addresses.

16. The method of claim 7, wherein the device uses the first portion of memory for at least one of communication with a supervisor and internal device purposes.

17. The method of claim 7, wherein validating the request includes executing a memory access at a first address.

18. The method of claim 17, wherein validating the request further includes verifying that the first address does not trigger a fault.

19. The method of claim 18, further comprising responsive to the first address triggering the fault, receiving an interrupt.

20. A non-transitory machine readable medium storing a program, which when executed causes a processor to:
   allocate a first portion of memory, wherein the memory also includes a second portion;
   reserve a range of application virtual addresses;
   program an input output memory management unit (IOMMU) to map the first portion of memory to the range of application virtual addresses in the IOMMU, wherein an application is restricted from modifying data within the range of application virtual addresses;
   configure a device to use the first portion of memory;
   receive a request including at least one virtual address and length from the application to use the device;
   verify that the at least one virtual address and length do not overlap the reserved range of application virtual addresses; and
   submit the request to the device.

* * * * *